United States Patent [19]

Breen

[11] 4,280,566
[45] Jul. 28, 1981

[54] AGRICULTURAL DISK HAVING NON-DIRECTIONAL FRACTURE PROPERTIES

[75] Inventor: Dale H. Breen, Naperville, Ill.

[73] Assignee: International Harvester Company, Chicago, Ill.

[21] Appl. No.: 30,194

[22] Filed: Apr. 16, 1979

[51] Int. Cl.³ .............................................. A01B 23/06
[52] U.S. Cl. .................................... 172/604; 172/747; 76/101 A; 29/402.01; 148/39
[58] Field of Search ................... 172/747, 604; 148/39, 148/149, 16.5; 29/148.3, 402.02, 530, 76, 77; 83/835, 676; 76/101 A, 101 R

[56] References Cited

U.S. PATENT DOCUMENTS

| Re. 9,169 | 4/1880 | Johnson | 172/555 |
|---|---|---|---|
| 213,439 | 3/1879 | Miller | 83/835 |
| 1,186,880 | 6/1916 | Canada | 172/555 |
| 1,292,336 | 1/1919 | Lee | 172/747 |
| 2,327,129 | 8/1943 | Ronan | 148/149 X |
| 2,416,742 | 3/1947 | Farr | 172/604 |
| 2,596,574 | 5/1952 | Lutes | 172/555 |
| 2,814,580 | 11/1957 | Hoover | 172/747 X |
| 3,408,237 | 10/1968 | Gulliksen | 148/39 X |
| 3,647,577 | 3/1972 | Gomada | 148/39 X |
| 3,959,863 | 6/1976 | Bruce | 172/604 |
| 4,099,576 | 7/1978 | Jilani | 172/555 |

*Primary Examiner*—Richard J. Johnson
*Attorney, Agent, or Firm*—Raymond E. Parks; Frederick J. Krubel; F. David AuBuchon

[57] ABSTRACT

A hardened agricultural disk, which is manufactured from a straight rolled steel, is provided with concentric rows of softened oblong areas or oblong openings, which are arranged radially inwardly of the periphery of the disk in non-diametrical alignment and in such a manner that a directional radial crack must pass into one of the areas, or openings, in one of the concentric rows, and be arrested in that row.

8 Claims, 3 Drawing Figures

AGRICULTURAL DISK HAVING NON-DIRECTIONAL FRACTURE PROPERTIES

BACKGROUND OF THE INVENTION

This invention relates to the manufacture of earthworking implements and, more particularly, to an agricultural disk made from a high carbon steel, or from a low carbon steel which is subsequently carburized, heated, quenched and tempered to a standard Rockwell hardness level which exhibits non-directional fracture characteristics or properties.

FIELD OF THE INVENTION

In the tillage and cultivation of land, the implement disk plays an important part, whether it is used for plowing or cultivation. Because of difficult soil conditions, maintenance and wear of the disks has presented a serious problem to the farmer and to the manufacturer. Disks during use may be subjected to extreme stresses due to severe impact conditions occurring when the disks strike boulders, rocks and other elements commonly found in some soils. For this reason, agricultural disks are expected to fracture. One of the important requirements for a disk is that when fracture does occur, that the crack length be short and essentially non-directional, that is, the crack path should change directions. The reason that this property is desired is that when the crack path is long and directional, complete segments of the disk can be broken off, sometimes completely halving the disk, and, when this happens, the disk essentially becomes inoperative. Fractures that change direction and return to the outer diameter, removing small pie-shaped sections, do not cause the disk to become inoperative and thus, are not considered to be as harmful.

Disks for agricultural uses may be stamped out of steel plate which has been straight rolled, therefore imparting to the product a somewhat linear fibre or grain flow with the flow lines substantially parallel across the disk. It has been found in the use of disks of this type that directional cracks will occur in the disk when subjected to severe conditions. Such cracks are directional in that they propagate linearly along the fibre flow in the direction of their rolling pattern. Directional fracture of the disks in this manner generally results in large chunks of metal breaking from the disks so that they are completely inadequate for further use. Thus when a disk is damaged in this manner the operator must immediately replace the same. Furthermore, if the broken disk is not replaced immediately, an adverse condition of plugging between adjacent disks, in a gang of disks on a harrow, oftentimes occurs. Additionally, the task of disassembling the disk gang to remove one or more broken disks and reassembling the disk gang with undamaged disks is not only time-consuming but vexatious as well.

The desirability of controlling the directional fracture characteristics of agricultral disks and the problems involved to achieve directional fracture control have been known for some time. One solution to directional fracture control problems with agricultrual disks made from rolled sheet steel, has been afforded to a large extent by criss-cross or cross rolling the steel plate from which the disks are ultimately made. Disks which have been manufactured by the cross rolling method have indicated a lower propensity toward directional failure once a crack starts at the edge of the disk. Thus in certain cases of fracture, only small portions would tear from the edges of the disks and though the disks would be defective they could still be used for a period of time. The development of the cross rolling process has resulted in a fibre flow design having improved properties preventing to some extent the directional fracture of metal disks when they strike an obstruction. However, cross rolling of disks requires additional machine and operator time which considerably adds to the expense of manufacture. In addition the complete absence of directional fractures is not found to be answered by this process. Agricultural disks made from cross rolled steel also occasionally fail by delamination parallel to the surfaces of the disk as a result of their lenticular shaped inclusions. Furthermore, cross rolled steel plates for manufacturing agricultural implement disks of many sizes are relatively unavailable from steel suppliers since the installation and operation of a steel plate cross rolling facility is very costly.

DESCRIPTION OF THE PRIOR ART

The present state of the art indicates that there are several ways of controlling the directional characteristics of cracks in disks. One of which is popular today is the aforementioned use of a cross rolled steel from which to make the disk. The cross rolling, which is done at the steel mill, tends to impart non-directional properties, depending upon the percentage of cross rolling that is done.

United States Pat. No. 2,814,580 —Hoover—Nov. 26, 1957 teaches an austempering heat treatment step of straight or single rolled steel to achieve the non-directional fracture characteristics.

The present invention contemplates the inclusion of built-in crack arresters in the disk which impede the directional crack path. One method of providing a disk with built-in crack arresters would be to perforate the body of the disk. Examples of perforated disks are shown in U.S. Pat. No. Re. 9,169—Johnson—Apr. 20, 1880, Class 172-555, U.S. Pat. No. 1,186,880—Canda—June 13, 1916, Class 172-555, U.S. Pat. No. 2,596,574—Lutes—May 13, 1952, Class 172-555, and U.S. Pat. No. 4,099,576—Jilani—July 11, 1978, Class 172-555. Although the above patents show perforated or spoked cutting disks, the perforation are not intended to provide areas of built-in crack arresters. The perforations are used as paddles for stirring or breaking up pieces of the soil. In addition, there are no means shown for preventing a directional linear crack path in the space between the perforations or openings in the body of the disk.

SUMMARY OF THE INVENTION

Agricultural implement disks are normally made from a high carbon steel, or from a low carbon steel which is subsequently carburized, heated, quenched and tempered to a hardness level of approximately 45 Rockwell "C". Although this hardness level is not extremely high, the resultant product is somewhat brittle and consequently once a fracture is initiated, it will tend to propagate in a directional straight line manner.

One of the primary objectives of the present invention is the provision of concentric softened (toughened) areas arranged in a staggering pattern radially inwardly of the periphery of the disk. These soft areas, being ductile and tough, interrupt the crack propagation.

Another objective of the present invention is to provide an agricultural disk with staggered concentric perforations radially inwardly of the periphery of the disk corresponding to the locations of the soft area.

Thus, the plurality of built-in crack arrester means, i.e. the staggered softened (toughened) areas and the staggered cutouts, interrupt the crack propagation and should another crack develop in another hardened zone of the disk, it would not be in line with the interrupted crack. Thus, the built-in crack arresters hinder the propagation of a crack and satisfy the requirements that the cracks be short and non-directional.

An automated procedure for producing a plurality of concentric staggered soft spots or zones or cutouts in the body of the disk can readily be achieved. One means of producing zones of high fracture toughness is by reducing the hardness to some level less than the original disk hardness. It is simply necessary to raise the temperature, of the previously hardened disk, in defined local areas in a short time span, to avoid diffuse heating throughout the disk, and then cooling at a sufficient rate to confine the heated and softened zones to the desired size. Rapid heating of localized spots or zones can be accomplished by various means such as induction, gas flame, plasma, or laser beam. Depending on the thermal input and disk size, the cooling could be accomplished by several means such as still air cooling or mass quench, air blasting, or liquid quenching. The reduced hardness level or range of the tempered staggered areas may be less than Rockwell "C" 40 but greater than Rockwell "C" 20. However the exact hardness range is not pertinent to the invention. Whereas the cutouts in the body of the disk can be made with any suitable dies, cutters or punches.

Another means of providing localized softening of a hardened disk is by localized quenching. Localized quenching is employed during the disk hardening operation to reduce the cooling rate in the defined local zones so that full hardening does not occur in these zones. Various simple mechanical means for restricting or eliminating the quench medium from contacting the disk surfaces can be devised.

Another means of producing the crack arrester means in the disk is by selective area carburizing. In this method one starts with a relatively low carbon material (0.20%), forms the disk to shape, and then subjects the disk to a carburizing heat treatment. However, before carburizing, the areas intended to be soft are coated with a stop-off material, either by copper plating or by coating with any commercial stop-off compound, such as Condrusal. The plating or coating prevents carbon penetration from occuring during the carburizing treatment in the plated or coated areas, which are intended to remain soft. On quenching, the high carbon regions resulting from carburizing harden to a high hardness, whereas the lower carbon areas, i.e. the plated or coated spots or zones, harden to a much lower hardness. After tempering, the hardness difference persists and the desired effect of spots or zones of softened (toughened) areas is achieved.

It should be noted that with any of the aforedescribed methods, the softened (toughened) can be on one surface, both surfaces, or extend through the disk thickness from one surface to the other surface. The number, size, shape, pattern arrangement, and depth of the softened zones can be varied to develop an optimum combination for cost and performance effectiveness.

The foregoing, and other important objects and desirable features, inherent in and encompassed by the invention, together with many of the purposes and uses thereof, will become readily apparent from a reading of the ensuing description in conjunction with the figures in the annexed drawing.

DESCRIPTION OF THE ILLUSTRATED EMBODIMENTS

Figures 1, 2, 3:
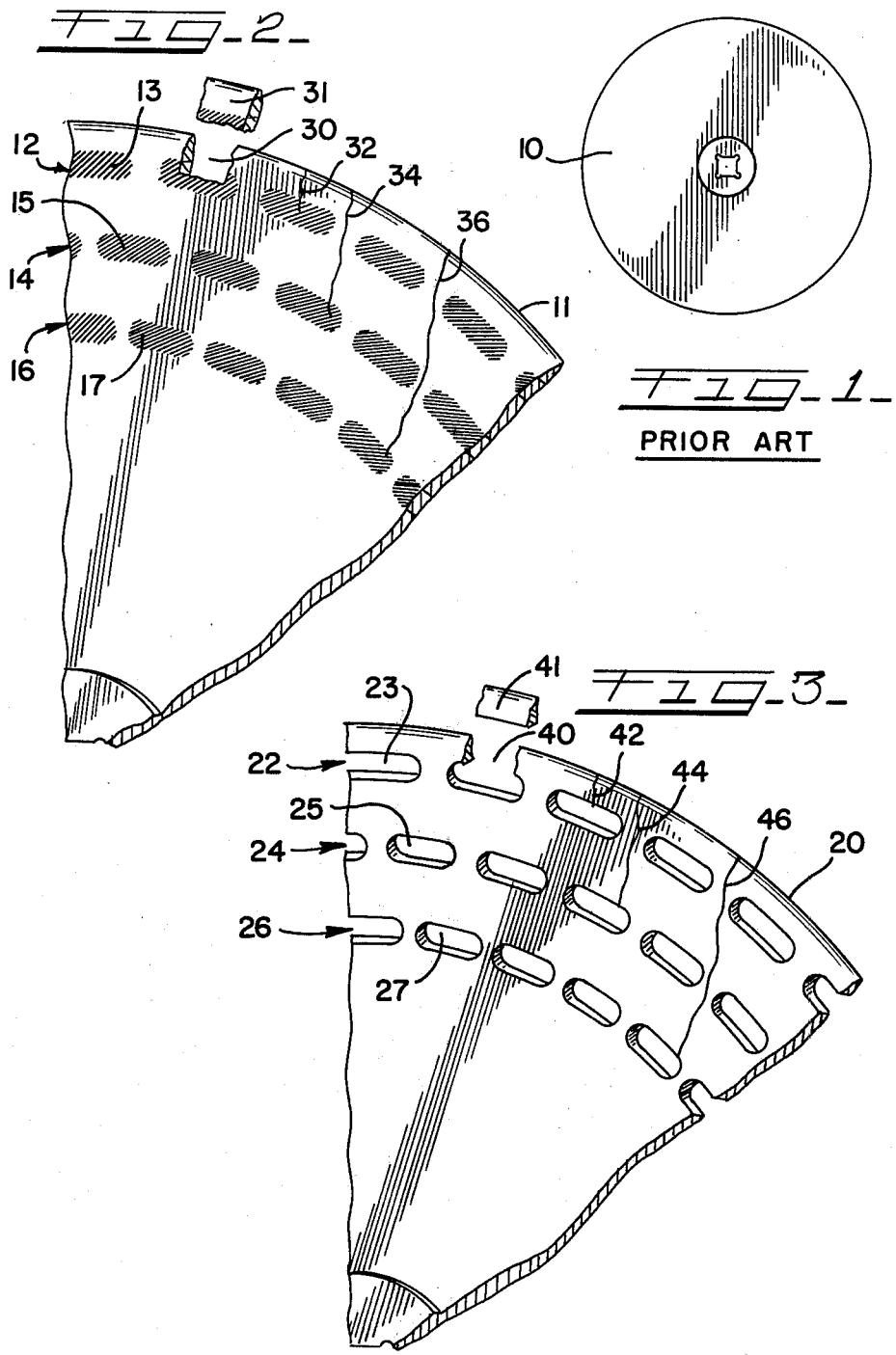
FIG. 1 is a plan view of a prior art agricultural disk.
FIG. 2 is a partial plan view of an improved agricultural disk, constructed in accordance with one embodiment of the invention, illustrating various directional cracks encountering softened areas concentrically distributed around the disk.
FIG. 3 is a partial plan view of another agricltural disk, constructed in accordance with another embodiment of the invention, also illustrating various crack lines encountering oval openings concentrically distributed around the disk.

FIG. 1 shows a typical agricultural disk 10 which may be made from a high carbon steel, or from a low carbon steel which is subsequently carburized, heated, quenched and tempered to arrive ultimately at a hardness level of approximately 45 Rockwell "C". The prior art disk is improved as shown in FIG. 2, by producing a plurality of concentric rings or rows 12, 14 and 16 of built-in crack arrester means in the form of soft spots 13, 15 and 17, or zones, by localized diffuse heating or tempering of a pre-hardened high carbon steel disk 10, or by copper plating or coating with a stop-off compound, such as Condrusal, to prevent carbon penetration prior to carburizing heat treatment of a low carbon steel disk 10. The oval softened areas 13, 15 and 17 concentrically distributed around and radially inwardly of the periphery of the improved disk 11 hinder the propagation of a directional crack as shown by crack lines 32, 34 and 36. Also shown in an area 30, wherein two crack lines 32 are intercepted in the softened area 13 and a piece 31 of the disk 11 is broken off within the confines of the softened area 13.

FIG. 3 shows the second embodiment of the invention wherein the softened areas are replaced by concentric rings or rows 22, 24, 26 of built-in crack arrester means in the form of oval holes or openings 23, 25, and 27. Similar to the FIG. 2 embodiment, the directional cracks 42, 44, and 46 are shown to be interrupted in the improved disk 20 by the oval holes 23, 25 and 27. A fragment 41 of the disk 20 is shown broken away in the area 40, where two spaced apart linear cracks 42 are intercepted by the oval opening 23 in the outermost ring of openings.

Thus, the soft areas 13, 15 and 17, in the three concentric rings 12, 14 and 16 of the FIG. 2 embodiment, and the oval openings or holes 23, 25 and 27 in the three concentric rings 22, 24 and 26 of the FIG. 3 embodiment interrupt and hinder crack propagation through the hardened disk making in effect, directional cracks non-directional. The staggered softened areas and openings ensure that one of the three rings 12, 14 or 16 and 22, 24 and 26 will intercept a linear crack from developing or progressing beyond the innermost ring 16 or 26 of softened areas or oval holes of the improved disks 11 or 20. Thus, the invention satisfies the requirements expected of disk fractures, that the cracks be short and be non-directional.

While particular embodiments of the invention have been shown and described, modifications may be made, and it is intended in the appended claims to cover all such modifications as may fall within the true spirit and scope of the invention.

The embodiments of the invention in which an exclusive property or privilege is claimed are defined as follows:

1. In an agricultural disk made from a straight rolled steel and hardened to a predetermined base hardness level, means for providing non-directional fracture characteristics to the hardened disk, comprising:

a plurality of concentric rows of circumferentially uniformly spaced-apart crack arrester means, the concentric rows arranged progressively radially spaced-apart and radially spaced inwardly from the periphery of the disk, the crack arrester means in each succeeding concentric row arranged in diametrical alignment with each circumferential space between the crack arrester means in each preceeding concentric row, the diametrically aligned and diametrically spaced-apart arrangements of crack arrester means and spaces between the succession of concentric rows of crack arrester means ensuring that in the event of a radial crack developing at the periphery of the disk that the radial crack cannot propagate through the circumferential and radial spaces between any two crack arrester means of each preceeding concentric row any further than to the ultimate radially inwardly concentric row without encountering at least one of the crack arrester means in the ultimate radially inwardly concentric row and be arrested by that crack arrester means; and wherein at least three concentric rows of crack arrester means are provided spaced radially inwardly of the periphery of the disk.

2. In an agricultural disk according to claim 1 wherein, the crack arrester means comprise circumferentially extending oblong areas having a hardness less than the predetermined base hardness level of the disk.

3. In an agricultural disk according to claim 2, wherein the base hardness level of the disk is approximately RC 45 and the lesser hardness of the oblong areas is within a range of RC 40 to RC 29.

4. In an agricultural disk according to claim 3, wherein the oblong areas are oval shaped.

5. In an agricultural disk according to claim 2, wherein, the disk is made from a low carbon straight rolled steel, and the oblong areas are formed on the disk by coating oval shaped crack arrester means thereon with a means for preventing carbon penetration during hardening of the disc by carburizing.

6. In an agricultural disc according to claim 2, wherein, the disk is made from a high carbon straight rolled steel and the oblong crack arrester means are formed on the disk by a means for reducing hardness in selected spots around the disk during a heat treatment operation of the disk.

7. In an agricultural disk according to claim 1, wherein, the three concentric rows of crack arrestor means comprise circumferentially extending and spaced apart oblong openings spaced radially inwardly of the periphery of the disk and arranged in non-radial alignment with each oblong opening of each preceeding row of oblong openings.

8. In an agricultural disk according to claim 7, wherein, the oblong openings are oval shaped.

* * * * *